Jan. 18, 1927.  E. D. ANDERSON ET AL  1,614,586
MACHINE FOR SEPARATING ARTICLES
Filed Oct. 29, 1924   4 Sheets-Sheet 2
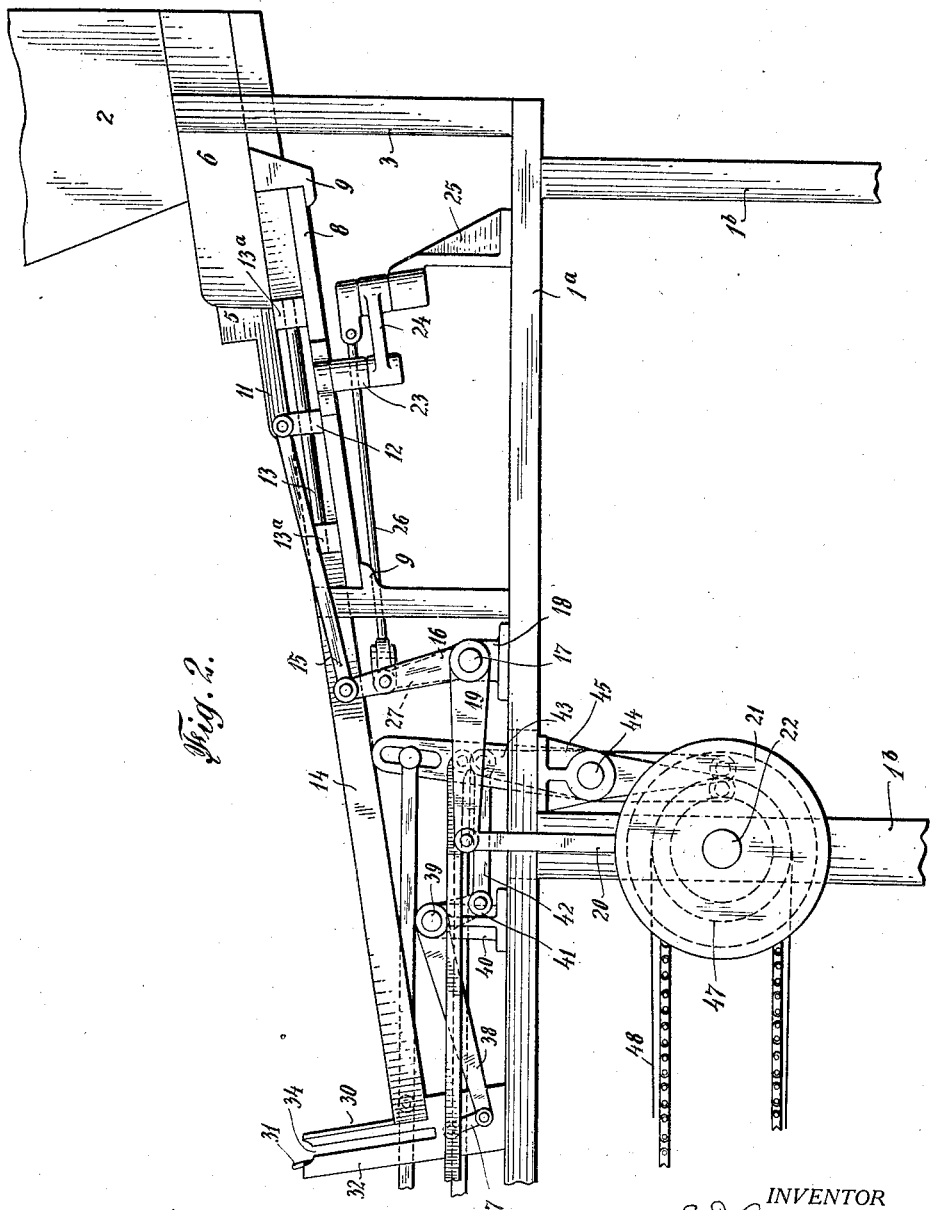

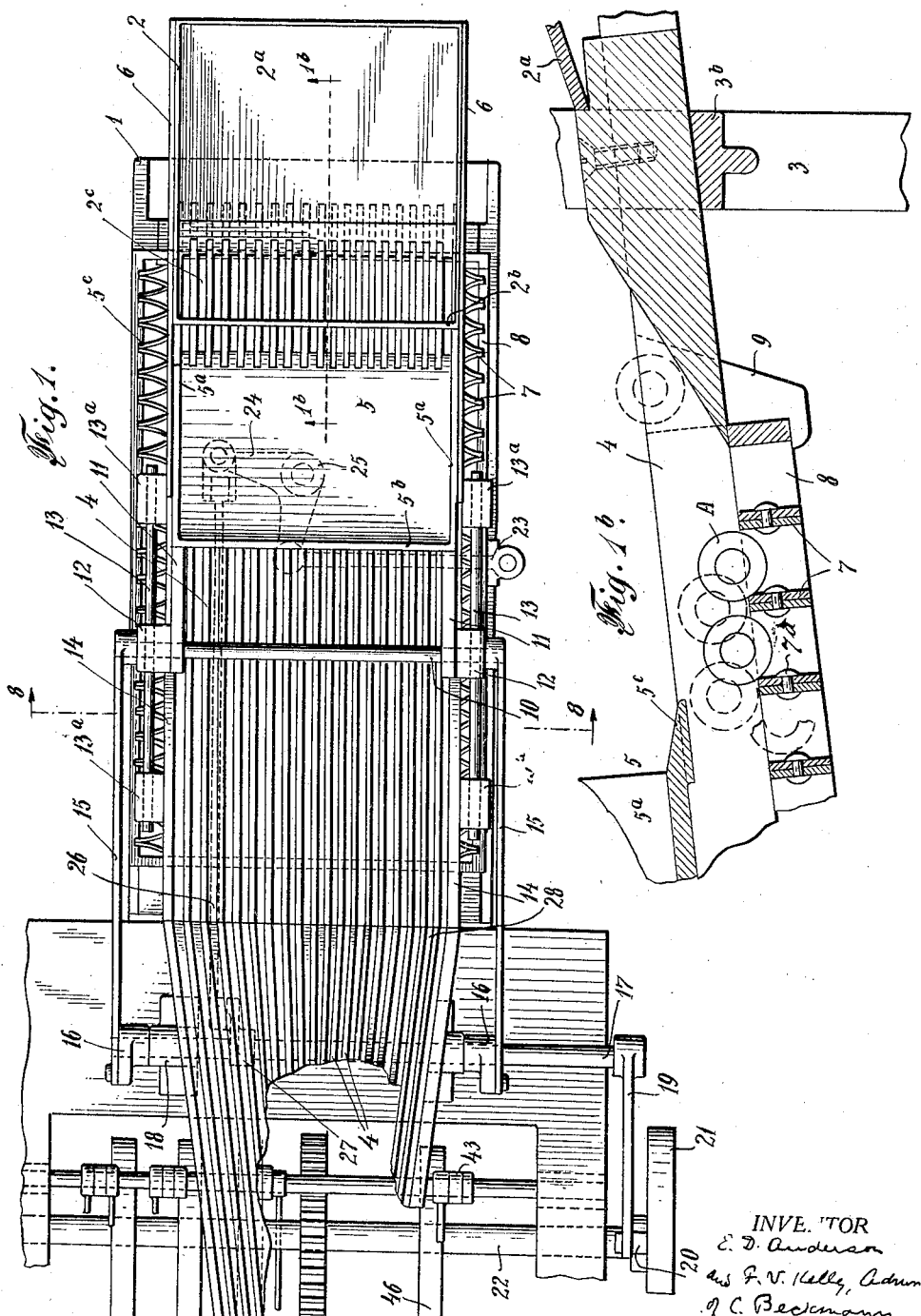

Jan. 18, 1927.　　　　　　　　　　　　　　　　　　1,614,586
E. D. ANDERSON ET AL
MACHINE FOR SEPARATING ARTICLES
Filed Oct. 29, 1924　　　　4 Sheets-Sheet 3
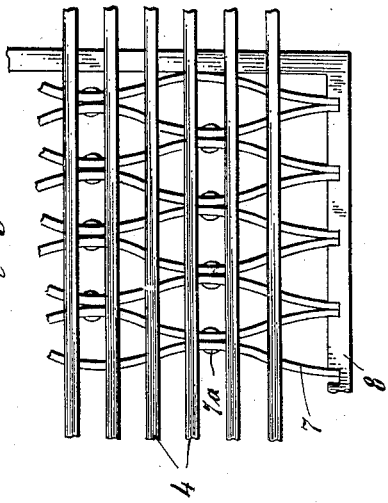
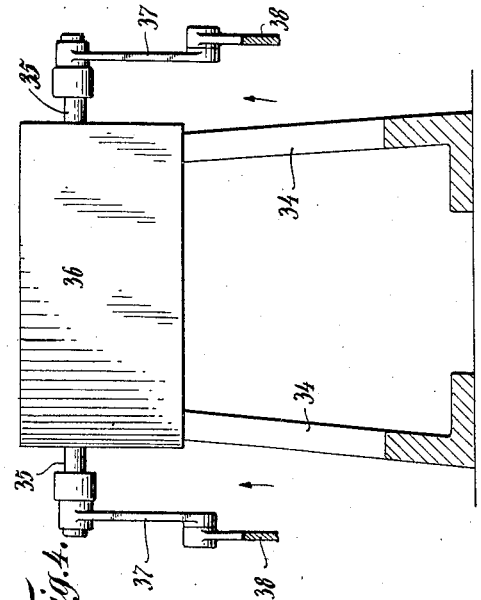
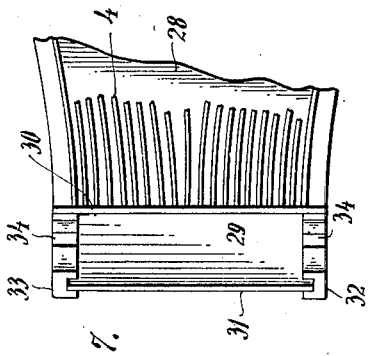
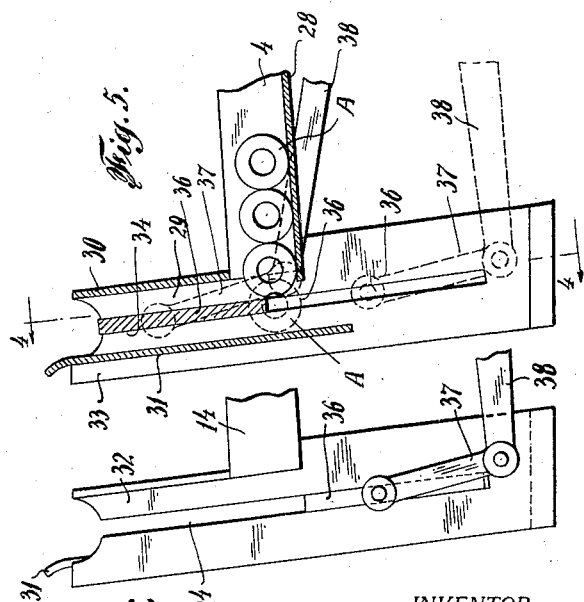
INVENTOR
E. D. Anderson
F. V. Kelly, Admr.
C. Beckman, deceased
By P. P. Bourne
ATTORNEY Jan. 18, 1927.
E. D. ANDERSON ET AL
1,614,586
MACHINE FOR SEPARATING ARTICLES
Filed Oct. 29, 1924    4 Sheets-Sheet 4
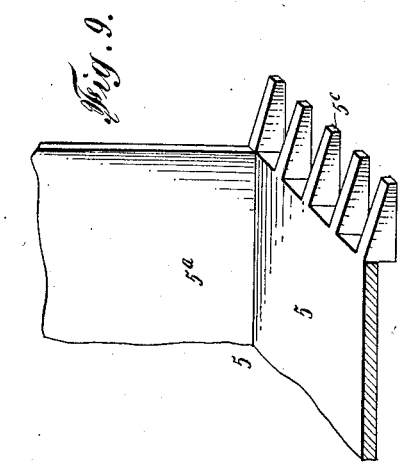
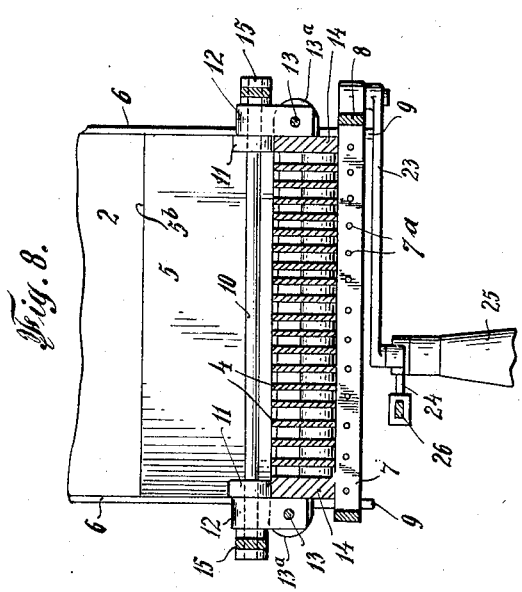
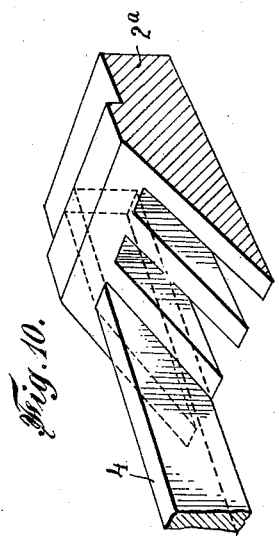
INVENTOR
E. D. Anderson
and F. V. Kelly, Admr.
J. C. Beckmann,
  deceased,
by T. A. Bourne
ATTORNEY Patented Jan. 18, 1927.

1,614,586

UNITED STATES PATENT OFFICE.

ERNEST D. ANDERSON, OF NEW YORK, AND CARL BECKMANN, DECEASED, LATE OF BROOKLYN, NEW YORK; BY FRANK V. KELLY, ADMINISTRATOR, OF BROOKLYN, NEW YORK; SAID ANDERSON AND SAID CARL BECKMANN ASSIGNORS TO E. D. ANDERSON, INC., OF NEW YORK, N. Y., A CORPORATION OF NEW YORK.

MACHINE FOR SEPARATING ARTICLES.

Original application filed February 27, 1920, Serial No. 361,673. Divided and this application filed October 29, 1924. Serial No. 746,711.

This invention has reference to improvements in means to supply articles in bulk and assemble a desired number of such articles successively in position to be enclosed in wrappers to provide wrapped packages of articles, such as candies and the like. Where certain kinds of articles, such as candied mints, are assembled in bulk there are liable to be broken pieces of the articles, loose particles and sugar in the mass, and one of the objects of this invention is to separate the articles to be wrapped from such broken and loose pieces etc. to prevent the latter from being wrapped with the correct articles.

The invention comprises a machine provided with a hopper or magazine to receive articles in bulk and means to agitate the articles to separate the broken or waste parts from the proper articles and assemble a definite number of articles side by side in position to be transferred to any suitable wrapping machine or other desired place.

The invention also comprises novel details of improvement and combinations of parts that will be more fully hereinafter set forth and then pointed out in the claims.

Reference is to be had to the accompanying drawings forming a part hereof, wherein—

Fig. 1 is a plan view of a machine embodying this invention;

Fig. 1$^b$ is an enlarged detail section substantially on the line 1$^b$, 1$^b$ in Fig. 1;

Fig. 2 is a side view of Fig. 1;

Fig. 3 is an enlarged fragmentary detail of the device for separating articles or goods from waste;

Fig. 4 is a sectional elevation or assembling device for the articles, substantially on line 4, 4, in Fig. 5;

Fig. 5 is a vertical section through Fig. 4;

Fig. 6 is a detail side view;

Fig. 7 is a fragmentary plan view of Fig. 5;

Fig. 8 is a cross section substantially on line 8, 8, in Fig. 1;

Figs. 9 and 10 are fragmentary perspective views enlarged of part of an agitator for separating articles from waste.

Similar numerals of reference indicate corresponding parts in the several views.

The main frame of the machine is indicated at 1, being shown provided with a table or plate 1$^a$ and leg 1$^b$. At 2 is a magazine or hopper which may be supported in an elevated position upon the main frame by means of uprights 3, (Figs. 1 and 2). Suitably spaced bars or rails 4 extend in a forwardly, downwardly inclined direction from the bottom of the hopper and are so spaced as to receive articles A, such as candies, on edge therebetween serving as guides for the articles. The bottom 2$^a$ of hopper 2 over bars 4 is spaced from the forward wall 2$^b$ of the hopper providing a space 2$^c$ for passage of articles A to said bars, (Fig. 1). Bars 4 are supported under the hopper by cross bars 3$^b$, (Fig. 1$^b$). An agitator 5 is slidably supported over bars 4, having sides 5$^a$ and an end wall 5$^b$ spaced from the hopper (Figs. 1, 1$^b$ and 9). The agitator is reciprocative between spaced walls 6 extending forwardly from the hopper. Below the bars 4 are cross bars 7 extending substantially transversely to bars 4 and which are shown carried by frame 8 which is shown upon ways or brackets 9 supported by the main frame, (Figs. 1, 1$^b$, 2 and 8), whereby the bars 7 may be reciprocated beneath bars 4. The bars 7 are shown bent in ogee form and alternately secured together by rivets 7$^a$, (Fig. 3), whereby irregularly disposed openings transversely of the machine are provided between bars 7 below bars 4. The agitator 5 is reciprocated lengthwise of the machine by means as follows:—A cross bar 10 is attached to projections 11 from the agitator, which bar is received by blocks 12 slidable on guide rods 13 secured to spaced blocks 13$^a$ secured to side walls 14 carried by the machine, (Figs. 1, 2 and 8). The ends of bar 10 are connected to links 15 that are pivotally connected to rock arms 16 secured upon shaft 17 journalled in bearings 18 on the main frame, (Figs. 1 and 2). Crank arm 19 is secured on shaft 17 and connected with link 20, (Fig. 2), that is co-operative with cam 21 secured on shaft 22 journalled on the main frame, (Figs. 1 and 2), whereby as said cam is rotated the agitator will be reciprocated. Frame 8 is pivotally connected with a link 23 which is pivotally connected with bell crank lever 24 journaled upon bracket 25 secured upon the main frame, (Figs. 1, 2 and 8), which bell crank is pivotally connected by link 26 with a rock arm 27 secured on shaft 17, (Figs. 1 and 2), whereby as said shaft is rocked the frame 8 with bars 7 will be reciprocated transversely of the machine. By the means described the agitator 5 is reciprocated to agitate the articles A on bars 4 to cause loose and broken pieces of the articles, small particles, sugar, etc., to sift through between the bars 4, and the reciprocation of the bars 7 causes loose pieces, sugar, etc., to fall away below. The inner edge of the agitator 5 is shown forked or comb-like at 5ᶜ to straddle and pass between the adjacent parts of bars 4 to push and agitate the articles. Notwithstanding that the articles may be deposited loosely in mass in the hopper the agitation of the articles upon bars 4 and the reciprocating action of the comb parts 5ᶜ of the agitator in the mass will cause the several articles that may be lying sidewise upon the bars 4 to enter edgewise between the bars 4. The downward inclination of bars 4 and the transverse reciprocations of the bars 7 will cause the articles A to roll forwardly over bars 7 to a bottom plate 28, on which the articles roll on edge, (Figs. 1, 1ᵇ, 4, 5 and 7). The parts 4 and 28 together constitute a sort of chute having spaced channels for assembling the articles side by side. Near the delivery ends of bars 4 the latter and side walls or rails 14 converge to and communicate with an upwardly disposed article transferring guideway 29, formed between spaced side walls 30, 31 and spaced end walls 32, 33, secured upon table 1ᵃ, (Figs. 1ᵇ, 2, 4, 5, 6 and 7). The wall 30 at its lower end terminates over bars 4, and wall 31 opposes the ends of said bars to admit series of articles A, assembled between bars 4 side by side to guideway 29 from the spaces between bars 4 for each package of articles to be formed, (Fig. 5). The number of spaced bars 4 determines the number of articles collected side by side for each package. Each series of articles A assembled at the ends of bars 4 is to be raised through guideway 29 to be transferred to a wrapper or for other disposition. In the example illustrated the side walls 32, 33 are slotted vertically at 34 to receive the ends of a transferring plate 36 reciprocative between the end walls 32, 33, (Figs. 4 and 5). When said plate is lowered its upper edge will permit the lowermost series of articles collected at the delivery ends of bars 4 to roll upon said plate. When the plate is raised it will elevate said articles to the upper part of guideway 29 and the plate is of sufficient depth to oppose the remaining articles between bars 4 to retain them until the plate is again lowered. Means to periodically raise and lower plate 36 are arranged as follows:—links 37 are pivotally attached to projections 35 from transferrer plate 36 and to arms 38 secured to cross shaft 39 journalled in brackets 40 on table 1ᵃ, (Fig. 2). Shaft 39 has a crank arm 41 connected by link 42 with rock arm 43 carried by rod 44 supported by brackets 45 on the main frame, (Fig. 2). A cam 46 on shaft 22 actuates arm 43 to cause rocking of arms 38 to raise and lower plate 36. Shaft 22 may be driven in any desired way.

The hopper may be supplied with the articles A in bulk and the machine being started the agitator 5 will be reciprocated lengthwise respecting the bars 4 and the frame 8 with its bars 7 will be reciprocated transversely respecting said bars 4 and beneath the same, whereby loose and broken pieces of the articles, small particles, sugar, etc., will be caused to sift through between the bars 4. The loose pieces, sugar, etc., will be caused to fall away below leaving the articles A free and such articles will be caused to roll edgewise along the bars 7, the agitator having the effect to cause the articles A to assume a rolling position on edge. The bars 7 are of such a thickness and so spaced apart respecting the diameters of the articles A that the latter may enter the spaces between bars 7 after the articles roll down between the inclined bars 4, so that the articles A will not touch one another at opposing edges, the width of the spacing between the several bars 4 being such as to retain the articles A in such spaces in an edgewise position so that said articles will roll edgewise from one to another of the bars 7 down to the receiving plate 28. By the means described the articles A are brought in an uninjured condition in side by side relation upon plate 28 to the delivery point where such articles may be removed in series side by side by the means described, or in any other desired way.

This application is a division of Letters Patent to Ernest D. Anderson and Carl Beckmann, granted November 25, 1924, No. 1,516,902, for wrapping and labeling machines.

Having now described the said invention what we claim as new is:

1. The combination of guides for articles, separating supporting means for the articles below one portion of the guides, means to actuate the supporting means, and an agitator reciprocative over the supporting means and having portions between the guides.

2. The combination of guides for articles, separating supporting means for the articles below one portion of the guides, means to actuate the supporting means, an agitator for the articles over the guides, and means to actuate the agitator.

3. The combination of spaced guides for articles, separating supporting means for the articles below the guides, means to actuate the supporting means relatively to the guides, and an agitator reciprocative over the supporting means and having portions between the guides.

4. The combination of spaced guides for articles, separating supporting means for the articles below the guides, means to actuate the supporting means relatively to the guides, an agitator over the guides, and means to actuate the agitator.

5. The combination of spaced guides for articles, spaced bars beneath the guides, the bars being of such shape as provide irregularly disposed openings transversely of the machine, and means to reciprocate the bars transversely respecting the guides.

6. The combination of spaced guides for articles, spaced bars beneath the guides, the bars being of such width as to prevent articles in the guides from engaging edge to edge, means to actuate the bars, an agitator over the guides, and means to actuate the agitator.

7. The combination of a downwardly inclined guide for articles, supporting means for the articles below the guide comprising spaced bars extending transversely respecting the guide having irregularly disposed openings therebetween transversely of the guide, and means to reciprocate the supporting means transversely respecting the guide, arranged so as to prevent two adjacent articles in the guide from engaging edge to edge.

8. The combination of a downwardly inclined guide for articles, supporting means for the articles below the guide comprising spaced bars extending transversely respecting the guide, means to reciprocate the supporting means, arranged as to prevent two adjacent articles in the guide from engaging edge to edge, an agitator over the guide for the articles, and means to reciprocate the agitator longitudinally respecting the guide.

9. The combination of spaced bars to receive articles therebetween, means to agitate the articles on the bars, means operative below the bars to retain the articles between the bars, and devices to operate said means to dislodge broken pieces and waste from between the bars.

10. The combination of spaced bars, means to supply articles to said bars, means to agitate the articles on said bars, bars movably mounted and spaced apart beneath the first named bars, means to move the second named bars relatively to the first named bars for dislodging broken pieces and waste from between the latter.

11. The combination of spaced bars, means to supply articles on said bars, means to agitate said articles to cause them to enter between the bars, a frame beneath the first named bars and provided with spaced bars in ogee form extending at an angle to the first named bars, means guiding said frame for movement with its bars relatively to the first named bars, and means to move said frame and its bars to cause dislodging of broken pieces and waste from between the first named bars.

12. The combination of spaced bars, a hopper for supplying articles to said bars, an agitator over the bars to engage and agitate said articles, means to actuate the agitator, retaining means below said bars having spaces for the passage of broken pieces and waste, and means to move said last named means relatively to the bars.

13. The combination of downwardly inclined spaced bars, a hopper to supply articles to said bars, an agitator over the bars provided with a comb-like portion having members operative in the spaces between said bars to engage the articles, means to operate said agitator, means beneath said bars having spaces to retain articles between the bars and cause dislodging of broken pieces and waste from between the bars, and means to operate the last named means.

ERNEST D. ANDERSON.
FRANK V. KELLY,
*Administrator of the Estate of Carl Beckmann, deceased.*